US012670094B2

(12) United States Patent
Wen

(10) Patent No.: US 12,670,094 B2
(45) Date of Patent: Jun. 30, 2026

(54) HYBRID-TYPE CACHE MECHANISM

(71) Applicant: Fortinet, Inc., Sunnyvale, CA (US)

(72) Inventor: Shushan Wen, Pleasant Hill, CA (US)

(73) Assignee: FORTINET, INC., Sunnyvale, CA (US)

( * ) Notice: Subject to any disclaimer, the term of this patent is extended or adjusted under 35 U.S.C. 154(b) by 0 days.

(21) Appl. No.: 18/669,267

(22) Filed: May 20, 2024

(65) Prior Publication Data

US 2025/0355804 A1 Nov. 20, 2025

(51) Int. Cl.
*G06F 12/08* (2016.01)
*G06F 12/0802* (2016.01)

(52) U.S. Cl.
CPC .................................. *G06F 12/0802* (2013.01)

(58) Field of Classification Search
CPC .............. G06F 12/0802; G06F 12/084; G06F 12/0842; G06F 12/0875; G06F 12/0891; G06F 12/1045; G06F 12/12; G06F 2212/68; G06F 2212/452
See application file for complete search history.

(56) References Cited

U.S. PATENT DOCUMENTS

| | | | | |
|---|---|---|---|---|
| 11,093,397 | B1 * | 8/2021 | Douglis ................ | G06F 12/128 |
| 2003/0177313 | A1 * | 9/2003 | Iyer ...................... | G06F 12/0848 |
| | | | | 711/173 |
| 2006/0143396 | A1 * | 6/2006 | Cabot ................... | G06F 12/121 |
| | | | | 711/134 |
| 2008/0235457 | A1 * | 9/2008 | Hasenplaugh ...... | G06F 12/0842 |
| | | | | 711/130 |
| 2008/0235487 | A1 * | 9/2008 | Illikkal ................ | G06F 12/126 |
| | | | | 711/207 |
| 2018/0203807 | A1 * | 7/2018 | Krueger .............. | G06F 12/0842 |
| 2025/0335363 | A1 * | 10/2025 | Dooley .............. | G06F 12/0891 |

FOREIGN PATENT DOCUMENTS

| | | | | |
|---|---|---|---|---|
| WO | WO2021087981 | * 11/2019 | ............. | G06F 16/23 |

* cited by examiner

*Primary Examiner* — Tracy C Chan
(74) *Attorney, Agent, or Firm* — Jaffery Watson Hamilton & DeSanctis LLP

(57) ABSTRACT
A system is disclosed. The system includes at least one physical memory device to store a cache table and report generation logic and cache management logic and one or more processors coupled with the at least one physical memory device to execute the cache management logic to perform cache operations on the cache table based on content types associated with each of a plurality of entries in the cache table, wherein each entry includes a tag, a type identifier (ID) and a payload.

20 Claims, 10 Drawing Sheets

HYBRID-TYPE CACHE MECHANISM

COPYRIGHT NOTICE

FIELD

Embodiments discussed generally relate to systems and methods for cache operations.

BACKGROUND

Conventional caching systems manage cache entries without differentiation of the types of the contents stored in the entry. However, due to the high cost of cache memory, an entire cache table achieves efficient usage when all types of contents may share cache table based on the dynamics of needs.

Hence, there exists a need in the art for enhanced systems, methods, devices, and/or approaches for maintaining a variety of types of contents in a cache that are managed by taking the features of the corresponding types into consideration.

SUMMARY

Various embodiments provide systems and methods for supporting prioritized cache operations in a hybrid-type cache system.

This summary provides only a general outline of some embodiments. Many other objects, features, advantages, and other embodiments will become more fully apparent from the following detailed description, the appended claims and the accompanying drawings and figures.

BRIEF DESCRIPTION OF THE DRAWINGS

A better understanding of the embodiments can be obtained from the following detailed description in conjunction with the following drawings, in which.

DETAILED DESCRIPTION

Figure 1A:
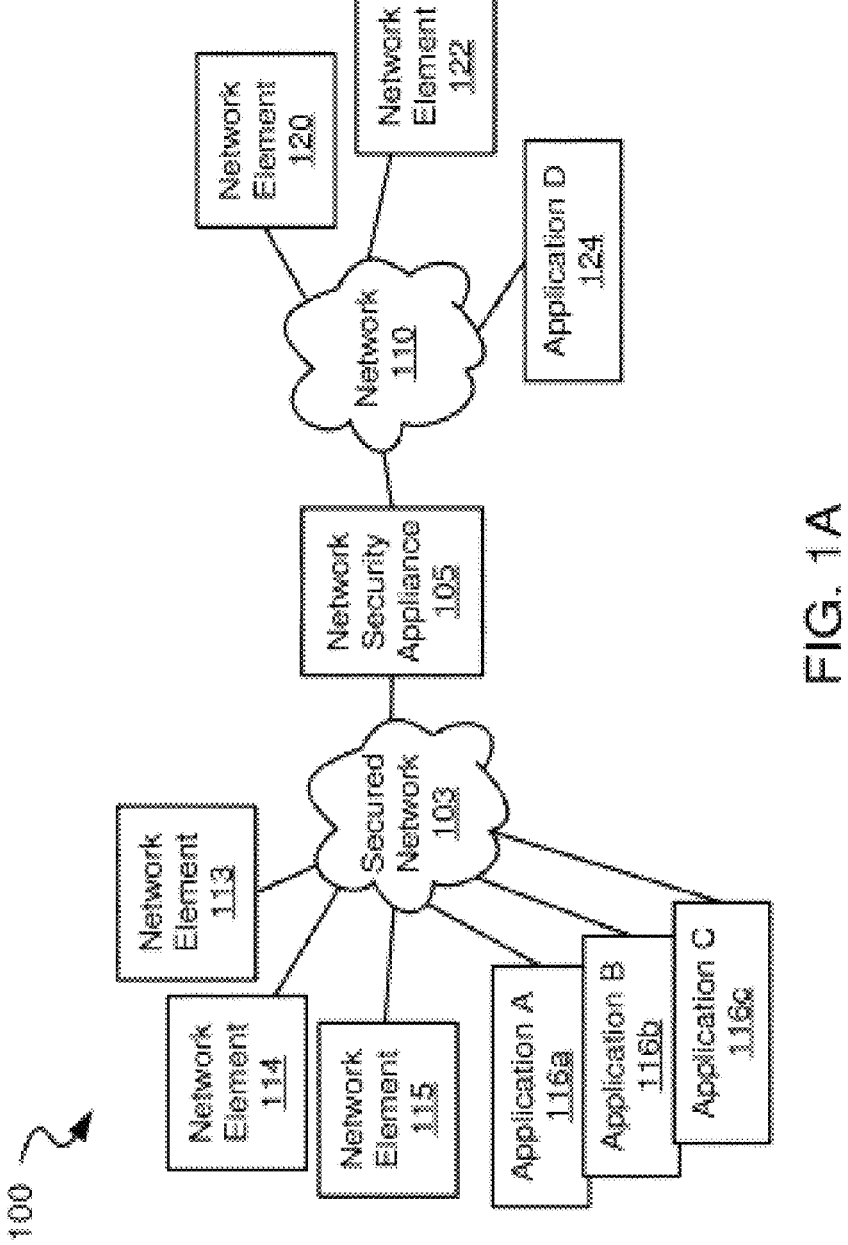
FIGS. 1A-1C illustrate embodiments of a network architecture including a network security appliance.

In a network security system, information included in a data packet in network traffic is typically cached. For example, a received packet is mapped to a packet-processing policy of a policy set, which results in a packet owner identifier (ID) obtained from a source IP address, as well as a packet service ID obtained from a combination of destination IP address, protocol, and destination port, being inserted (or cached) within the same cache with other ID types. However, based on policy settings, some cached information may be updated more frequently than other information. For instance, the owner ID and corresponding cache entries may be updated more frequently than the service ID.

The basic operations in a conventional cache updating process includes insertion, removal, and replacement. To enable the cache search, entries are added (cache insertion) once a match is found. When the database is updated, the outdated cache entries are removed (cache removal). When all cache entries in the cache set are occupied, a new entry will replace an existing entry (cache replacement). As discussed above, conventional caching systems cannot differentiate between types of content stored in cache entries when processing cache entries. Thus, conventional caching systems implement cache replacement policies that do not consider the type of cached data within an entry prior to cache removal.

According to one embodiment, a hybrid cache management mechanism is provided to perform cache operations based on content type within cache entries. In such an embodiment, the management mechanism assigns a priority value to each type of content (or content type) inserted into a cache line and processes cache management decisions based on priority values of entry content type. Thus, cache management decisions are affected by the interaction of different priority values existing in the cache system.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware, and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically crasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance" or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a network security device" that may reside within the particular network that it is protecting, or network security may be provided as a service with the network security device residing in the cloud. For example, while there are differences among network security device vendors, network security devices may be classified in three general performance categories, including entry-level, midrange, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DoS attack detection and mitigation appliances).

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

Example embodiments will now be described more fully hereinafter with reference to the accompanying drawings, in which exemplary embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views of processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Turning to FIG. 1A, network architecture 100 is shown in accordance with some embodiments. In the context of network architecture 100, a network security appliance 105 controls access to network elements within a secured network 103. Secured network 103 may be any type of communication network known in the art. Those skilled in the art will appreciate that, secured network 103 can be a wireless network, a wired network, or a combination thereof that can be implemented as one of the various types of networks, such as an Intranet, a Local Area Network (LAN), a Wide Area Network (WAN), an Internet, and the like. Further, secured network 103 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

Secured network 103 provides for internetwork communications between network elements 113, 114, 115 and applications 116 (e.g., application A 116a, application B 116b, and application C 116c). Network security appliance 105 operates as a gateway between secured network 103 and outside networks (e.g., a network 110). Network 110 may be any type of network known in the art. Thus, network 110 may be, but is not limited to, a wireless network, a wired network or a combination thereof that can be implemented as one of the various types of networks, such as the Internet, an Intranet, a Local Area Network (LAN), a Wide Area Network (WAN), and the like. Network security appliance 105 provides for communications between network element 113 and network element 120, network element 122, and network element 124 via network 110.

Figure 1B:
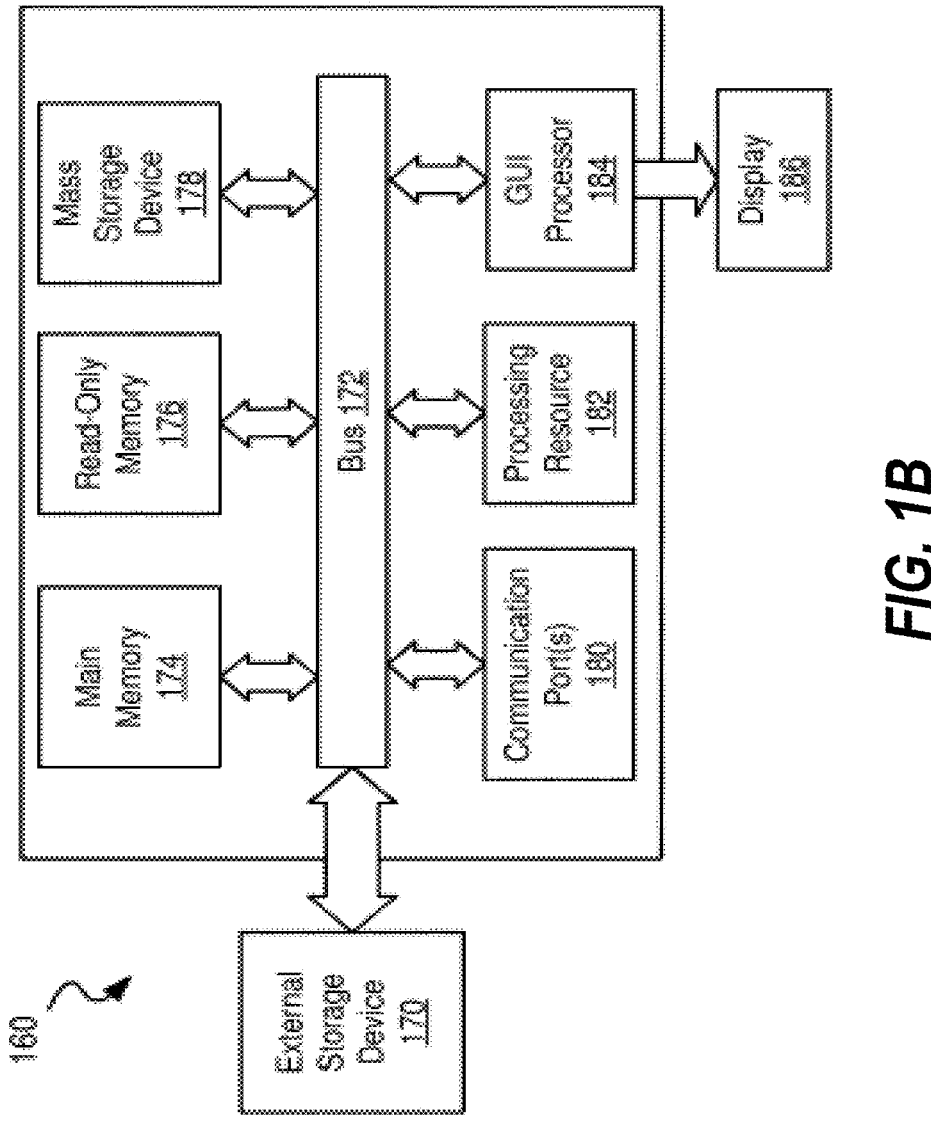

Turning to FIG. 1B, an example computer system 160 at which network security appliance may be utilized. As shown in FIG. 1B, computer system 160 includes an external storage device 170, a bus 172, a main memory 174, a read-only memory 176, a mass storage device 178, one or more communication ports 180, one or more processing resources (e.g., processing circuitry 182), and a graphical user interface (GUI) processor 184. GUI processor 184 drives a display 186. In one embodiment, computer system 160 may represent some portion of any of network security appliance 105.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25 G, 40 G, and 100 G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g., start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g., a Peripheral Component Interconnect (PCD/PCI Extended (PCI-X) bus, Small Computer System Interface (SCSI), USB or the like, for connecting expansion cards, drives and other subsystems as well as other buses, such as front side bus (FSB), which connects processing resources to software systems.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer systems limit the scope of the present disclosure.

Figure 1C:
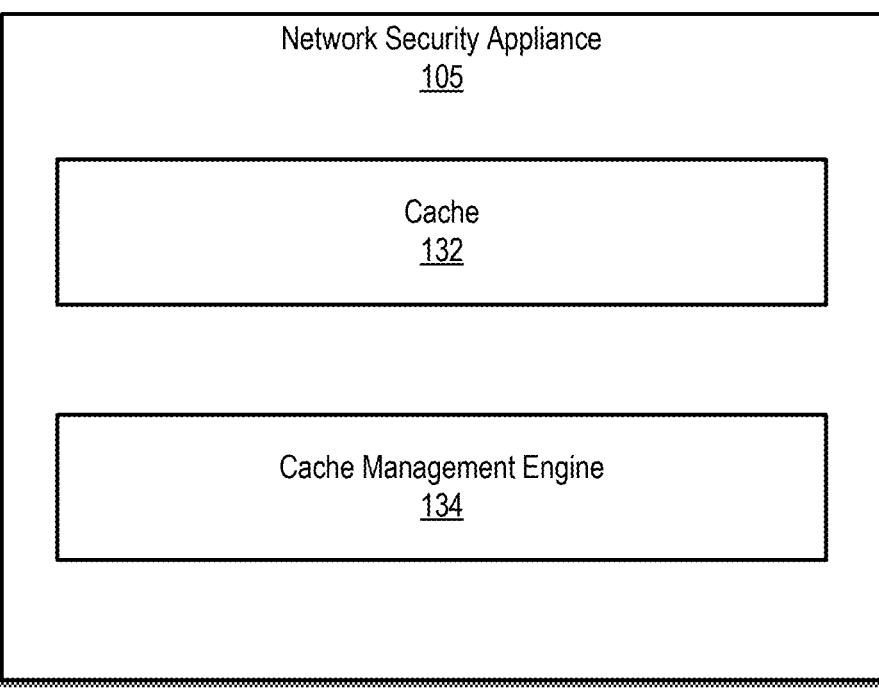
Figure 2:
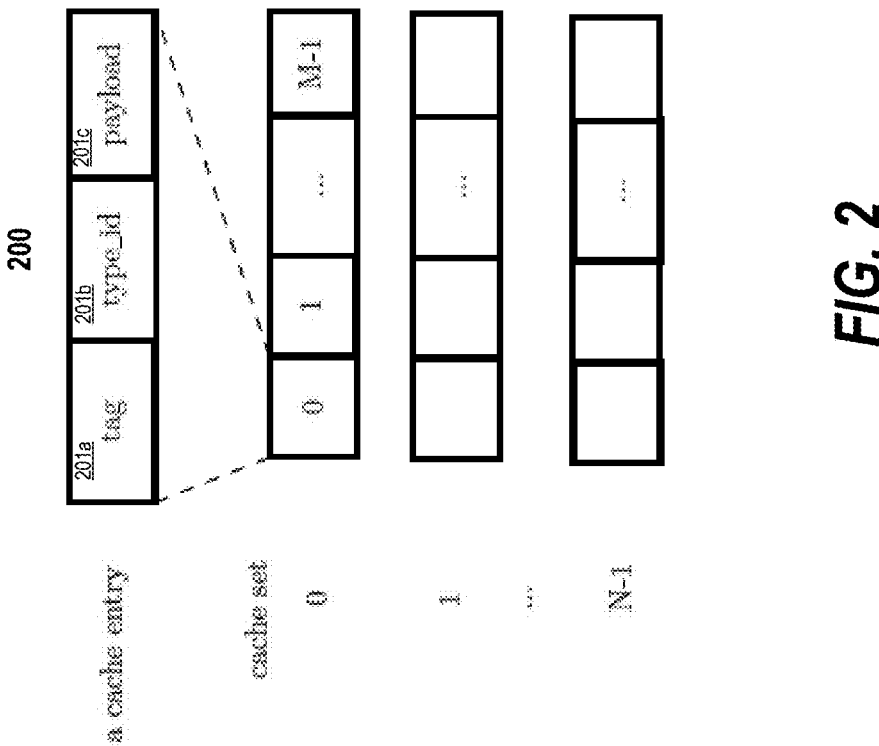
FIG. 2 illustrates one embodiment of a hybrid-type cache structure.

Turning to FIG. 1C, network security appliance 105 includes cache 132 and cache management engine 134. Cache 132 is a cache memory that is implemented to store received network traffic information. In one embodiment, cache 132 comprises a hybrid-type structure implemented to store entries having a plurality of content types. FIG. 2 illustrates one embodiment of a hybrid-type cache 200 structure having a plurality N (e.g., 0-N−1) cache sets, each including a plurality of M (e.g., 0-M−1) cache entries. According to one embodiment, each cache entry includes a plurality of fields 201a, 201b and 201c. In this embodiment, fields 201a, 201b and 201c comprise tag, type ID (or type_id) and payload fields, respectively. However in other embodiments, cache entries may comprise different qualities, as well as different types, of fields. In further embodiments, variable length payloads may also be implemented.

Cache management engine 134 is implemented to manage cache 132 operations. In one embodiment, cache management engine 134 performs searches of cache 132 upon receiving a search request. In such an embodiment, a search is performed by performing a hash operation to map a received key to a hash value. In a further embodiment, the hash value comprises a tag component and an index (idx) component. The idx component is used to locate a corresponding cache set in cache 132 (or cache_tbl). The search also includes inspecting the entries in a cache set to match the type_id as well as tag component. The payload associated with a matching entry is reported with a cache hit. If, A cache miss is reported, if no entry has a match. This typically results in having to find the match in a database, which is a slower method.

According to one embodiment, a type_id represents an owner, the key comprises a source IP of a packet, and the cache payload comprises the owner ID that matches the key. In another embodiment, a type_id represents a service, the key comprises a combination of destination IP, protocol, and destination port of the packet and the cache payload comprises the service ID that matches the key.

Figure 3:
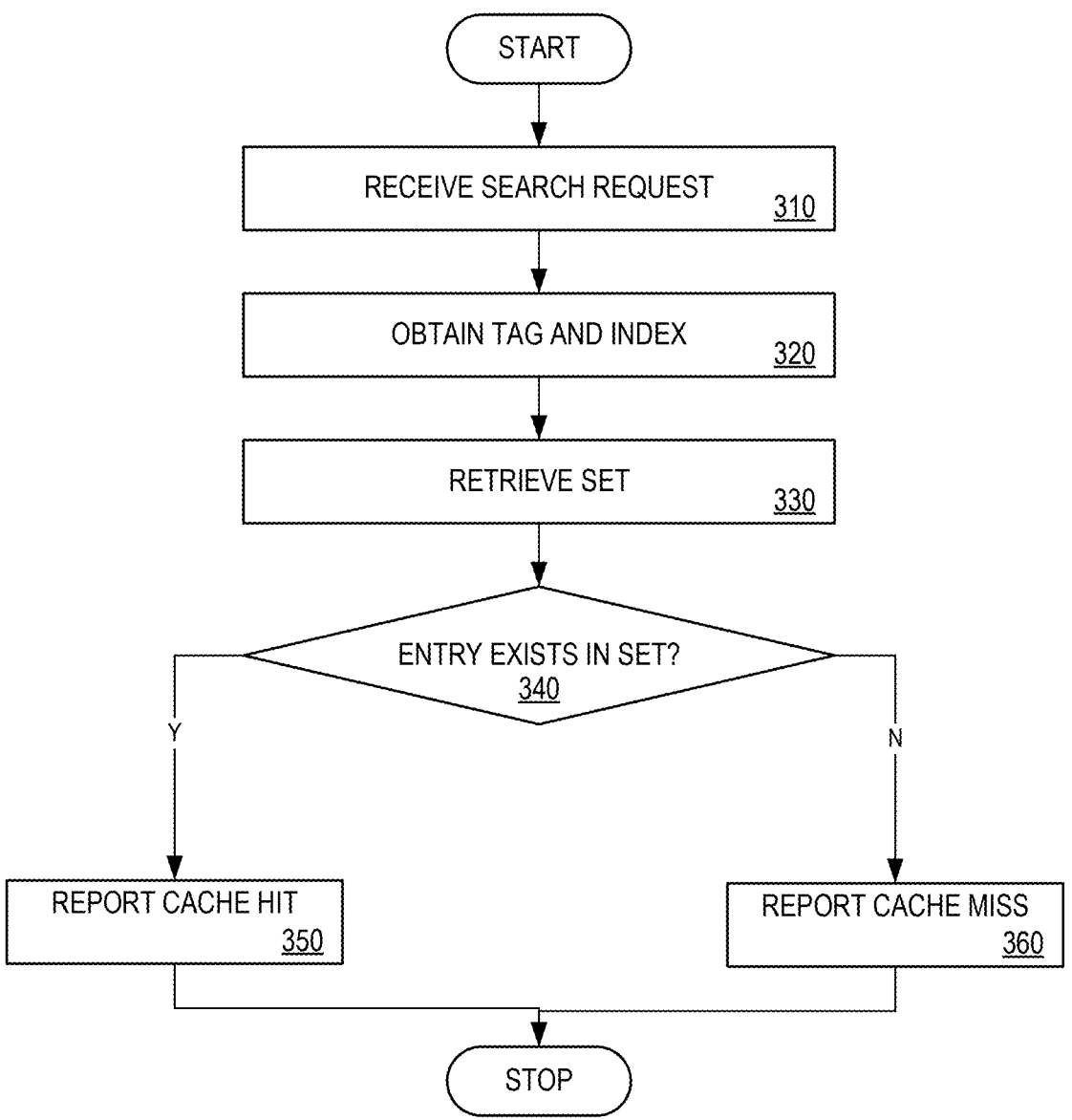
FIG. 3 a flow diagram illustrating one embodiment of a process for searching a hybrid-type cache structure.

FIG. 3 a flow diagram illustrating one embodiment of a process for searching a hybrid-type cache structure. At processing block 310, a search request (e.g., key, type_id) is received. At processing block 320, the tag and idx are obtained based on a hash of the key ({tag, idx}=hash (key)). At processing block 330, the cache set is retrieved using idx (e.g., get set=cache tbl[idx]). At decision block 340, a determination is made as to whether the entry (e) exists in the set based on the tag and the type_id (e.g., (e.tag==tag) AND (e.type id==type id)). A cache hit is reported upon a determination that the entry exists, processing block 350. Otherwise a cache miss is reported, processing block 360.

Cache management engine 134 is also implemented to perform cache 132 updates. As in a conventional cache, the basic operations to update cache 132 includes insertion, removal, and replacement. To enable the cache 132 search, entries are added (e.g., cache insertion) once a match is found from a non-cache method (e.g., database search). Outdated cache entries are removed (e.g., cache removal) whenever the database is updated. A new entry will replace an existing entry (e.g., cache replacement) once all cache entries in a cache set are occupied. In one embodiment, cache replacement involves using the priorities of different content types.

One approach to cache replacement is a naïve approach in which cache management engine 134 finds an entry having the lowest priority in a particular set, and replaces entry with the new entry. In certain scenarios, the entries of lowest priority are quickly replaced and there are no lowest priority entries in the cache. However, cache starvation on any type_id needs to be prevented to effectively share cache 132.

Figure 4:
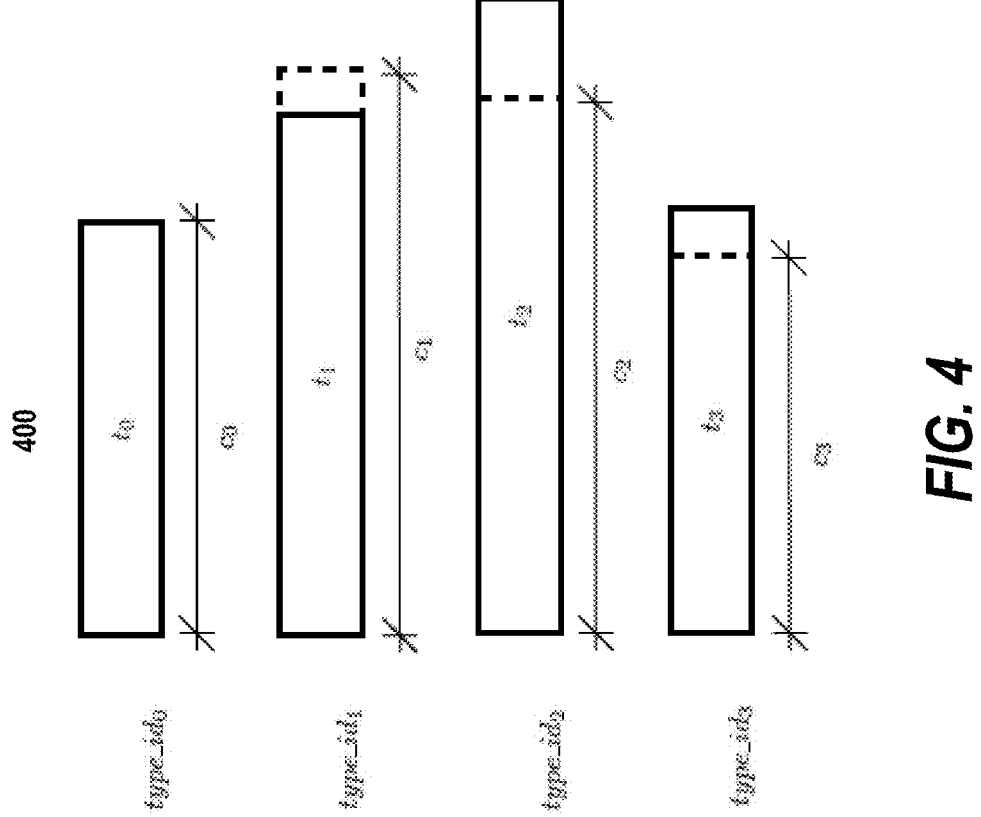
FIG. 4 illustrates one embodiment of type identifiers for a quota based cache replacement scheme.

According to one embodiment, cache management engine 134 may implement a quota-based replacement scheme to perform cache replacement. In such an embodiment, cache management engine 134 assigns a quota (or threshold) to each type_id in a cache table. FIG. 4 illustrates one embodiment of a quota-based cache replacement scheme 400. As shown in FIG. 4, scheme 400 includes type_id$_0$, type_id$_1$, type_id$_2$ and type_id$_3$, each having corresponding quotas (or thresholds) $t_0$, $t_1$, $t_2$, $t_3$ and counters, $c_0$, $c_1$, $c_2$, $c_3$. Each counter represents the quantity of entries in a cache table associated with a type_id.

At a specific time, some counters may have not reached the quota (e.g., $c_2 < t_2$, and $c_3 < t_3$), while some counters may have exceeded the quota (e.g., $c_1 > t_1$). Also, some counters may equal the quota (e.g., $c_0 = t_0$). In this case, an entry corresponding to $c_1$ is the preferred replacement candidate. If there is no such entry in the given set, an existing entry is chosen at random as replacement. When all types of entries are updated frequently, the quota-based replacement scheme provides a simple solution. On the other hand, if during a certain period of time, some types have no new entries inserted, their counters can fall below the quotas and maintain low, so their existing entries may take longer time to be replaced.

In one embodiment, cache management engine 134, upon receiving a new entry (e_new) and determining that there is no empty entry in a set, searches for an existing entry (e.g., e1) with the same type_id that has a counter value greater than the quota (e.g., type_id$_1$ shown in FIG. 4). Cache management engine 134 selects the existing entry for replacement upon finding such an entry. Otherwise, a random entry (e.g., e2) is selected for replacement. Cache management engine 134 updates the associated counters once an entry has been selected for replacement. In such an embodiment, the counter corresponding to the type_id of the selected entry (e1 or e2) is decremented, the counter corresponding to the type_id of the new entry is incremented. Subsequently, e_new is entered into the cache entry as the replacement. In other embodiments, a counter may also be decremented each time an entry is removed from a cache set.

Figure 5:
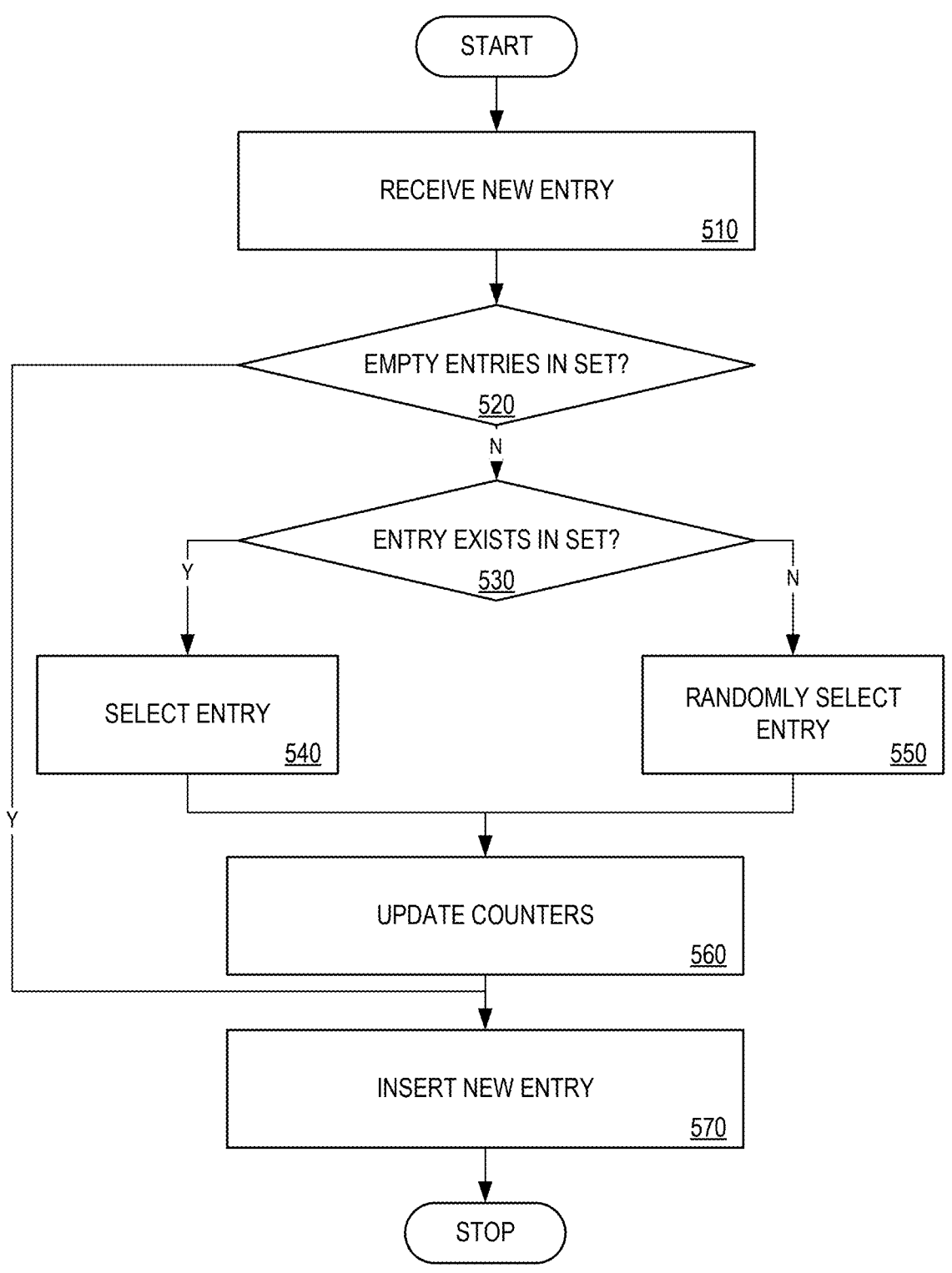
FIG. 5 is flow diagram illustrating one embodiment of a quota based cache replacement process.

FIG. 5 is flow diagram illustrating one embodiment of a quota based cache replacement process. At processing block 510, a new entry (e_new) is received. At decision block 520, a determination is made as to whether an empty entry exists in the set (e.g., an entry associated with a type_id having a counter value greater than the quota). If so, e_new is inserted, processing block 570. Otherwise, a determination is made as to whether an entry exists in the set having a counter value for a type_id that exceeds the quota, decision block 530. An entry is selected for replacement upon a determination that a counter value exceeds the quota for a type_id, processing block 540. However, a random entry is selected for replacement upon a determination that no counter exceed a quota, processing block 550. At processing block 560, counters are updated. At processing block 540, e_new is inserted.

Figure 6:
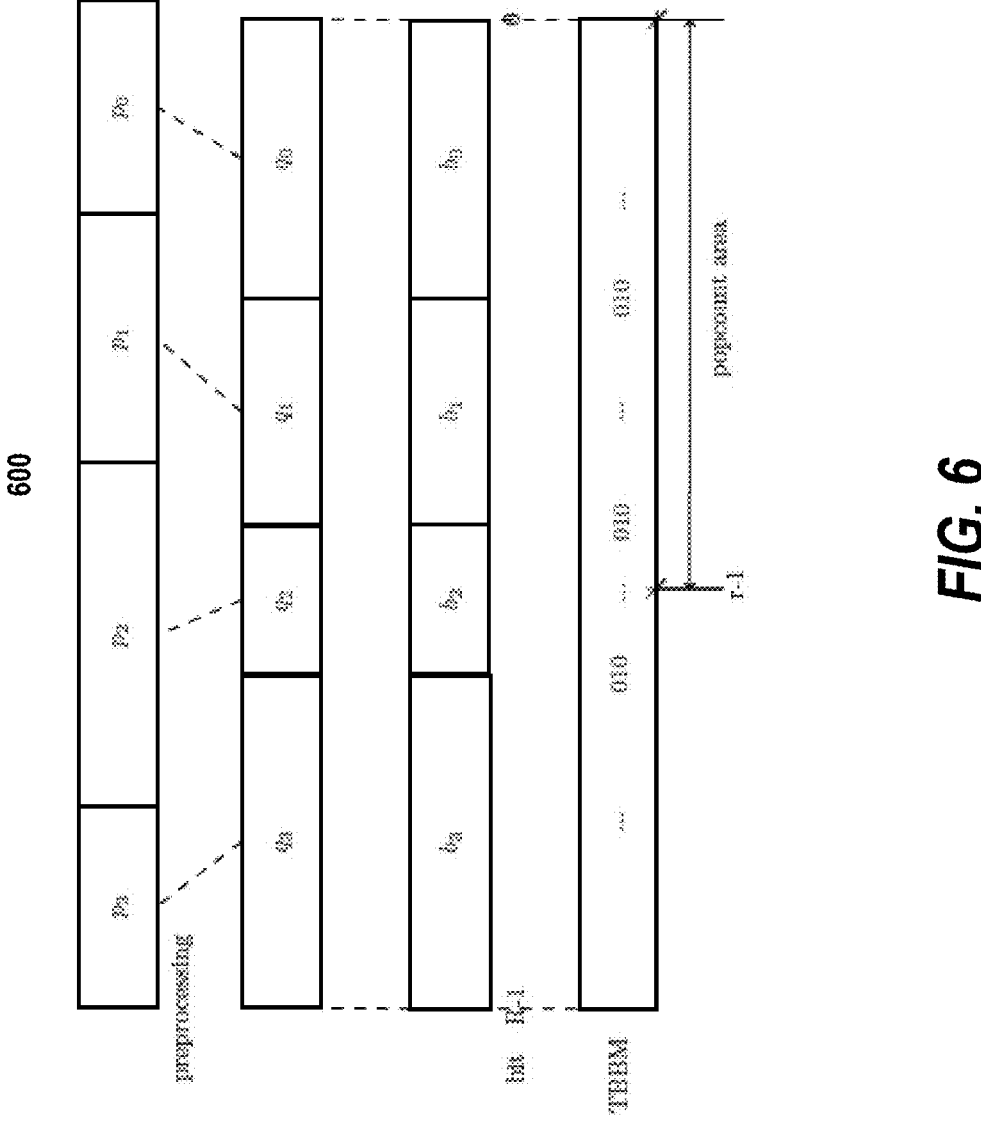
FIG. 6 illustrates one embodiment of a type-boundary bitmap

Cache management engine 134 may also implement a prioritized random selection scheme to perform cache replacement. In one embodiment, cache management engine 134 generates a type-boundary bitmap (TBBM) to implement the prioritized random selection scheme. FIG. 6 illustrates one embodiment of a TBBM 600 including priorities $p_i$ (e.g., $p_0$, $p_1$, $p_2$ and $p_3$), which represent the priority of a type_id$_i$. In one embodiment, a larger value of p represents a higher priority and the width of each p represents the value (e.g., $p_3 < p_0 < p_1 < p_2$). Although shown as having four type_ids, other embodiments may be extended to any quantity of type_ids.

In one embodiment, $p_0$, $p_1$, $p_2$ and $p_3$ are assigned values $q_0$, $q_1$, $q_2$ and $q_3$ during a preprocessing step, such that if $p_i > p_j$, then $q_i < q_j$, for i≠j. In other words, a larger value q of represents a lower priority. As shown in FIG. 6, $q_3 > q_0 > q_1 > q_2$. According to one embodiment, the p to q mapping is based on:

$$q_i = \frac{\sum_{j=0}^{K-1} p_j - p_i}{K-1}$$

where K (K>1) is the number of type_ids (e.g., K=4 in FIG. 6). This process preserves the sum of values between p and q, e.g., $$\sum_{i=0}^{K-1} p_i = \sum_{i=0}^{K-1} q_i,$$

if the system has restrictions.

According to one embodiment, once cache management engine 134 has values of q for all types, it may keep these values and neglect the about p values. Let R be the bit width of the TBBM, the value of $q_i$ in the current set is further mapped to a block value:

$$b_i = \frac{q_i}{\sum_{j=0}^{K-1} q_j} R$$

Thus $q_0$, $q_1$, $q_2$, $q_3$ in FIG. 6 are mapped to four blocks, $b_0$, $b_1$, $b_2$, $b_3$, respectively, on a full scope from 0 to R−1.

Subsequently, the TBBM is created by setting the bits on the type boundaries to 1s, which are located at:

$$b_0 - 1, \tag{1}$$

$$b_0 + b_1 - 1, \text{ and} \tag{2}$$

$$b_0 + b_1 + b_2 - 1. \tag{3}$$

Divided by the boundaries, block $b_0$ ranges from 0 to $b_0$−1, block $b_1$ ranges from $b_0$ to $b_0$+$b_1$−1, block $b_2$ ranges from $b_0$+$b_1$ to $b_0$+$b_1$+$b_2$−1, and block $b_3$ ranges from $b_0$+$b_1$+$b_2$ to R−1. Thereafter, a random integer number r between 1 to R is generated, and use popcount(TBBM & ((1<<r)−1)) to select a type_id. In one embodiment, popcount is an instruction that counts number of 1s in the given variable in binary format (e.g., the component of the TBBM from bit 0 to bit r−1). Once a type_id is selected, an existing entry carrying this type_id can be replaced by the new entry.

Figure 7:
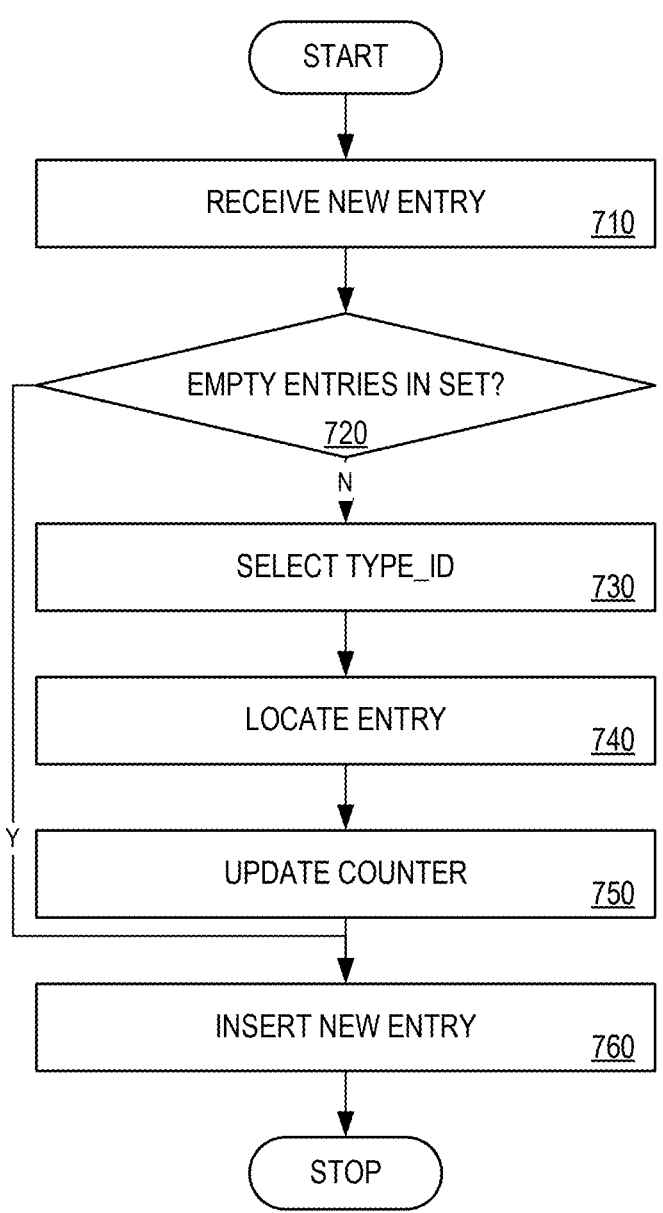
FIG. 7 is a flow diagram illustrating one embodiment of a prioritized random-selection cache replacement process.

FIG. 7 is a flow diagram illustrating one embodiment of a prioritized random-selection cache replacement process. At processing block 710, e_new is received. At decision block 720, a determination is made as to whether an empty entry exists in the set. If so, e_new is inserted, processing block 760. Otherwise, a type_id in the set is prioritized randomly selected, processing block 730. At processing block 740, an entry having the selected type_id is located within the set. At processing block 750, counters are updated. At processing block 760, e_new is inserted.

In embodiments, the prioritized random selection scheme may maintain a TBBM for each set as a fine version. However in other embodiments, the prioritized random selection scheme may maintain a TBBM for the cache table as a coarse version. Whenever a cache update operation causes the last entry of a certain type_id to be removed, or an entry of a new type_id to be inserted, the TBBM will be updated, as at least one type boundary is changed. Alternatively, the TBBM does not change if entry e has the same type_id as entry e_new.

In yet another embodiment, cache management engine 134 may implement a second chance scheme to perform cache replacement. In the second-chance scheme, in cache management engine 134, the only state that the cache system maintains for each type_id$_i$ (i=0, 1, . . . , K−1) is a survival rate (s$_i$ (0≤s$_i$≤1)) having a larger value for a higher priority. The effect of s is correlated to the priority. However in this embodiment, the aforementioned p is not used since the value p is not required to be within 0 and 1.

Based on a new entry's arrival rate of different type_ids, which reflects replacement frequency of existing entries of all type_ids combined, the second-chance scheme manages cache replacement in one of three scenarios. In one scenario, entries with different priorities have similar arrival rates. In this scenario, entries with a lower priority have a higher chance of being replaced in the first round. There are fewer entries with a lower priority than those with a higher priority once type_ids in the cache table reach a stable state. Therefore, a cache hit happens more likely for a higher-priority request.

In a second scenario, entries with a lower priority have a higher arrival rate. In this scenario, entries with a lower are replaced and renewed more often. Eventually there may be fewer entries with a higher priority than those with a lower priority, which leads to a higher cache miss rate for a higher-priority request. However, the cache hit rate will improve accordingly once higher-priority requests are received more frequently.

In the third scenario, entries with a higher priority have a higher arrival rate. In this scenario, entries with a lower priority are replaced more often and are eventually fewer. However, the lower priority entries do not starve completely as long as they are renewed at a reasonable rate.

Figure 8:
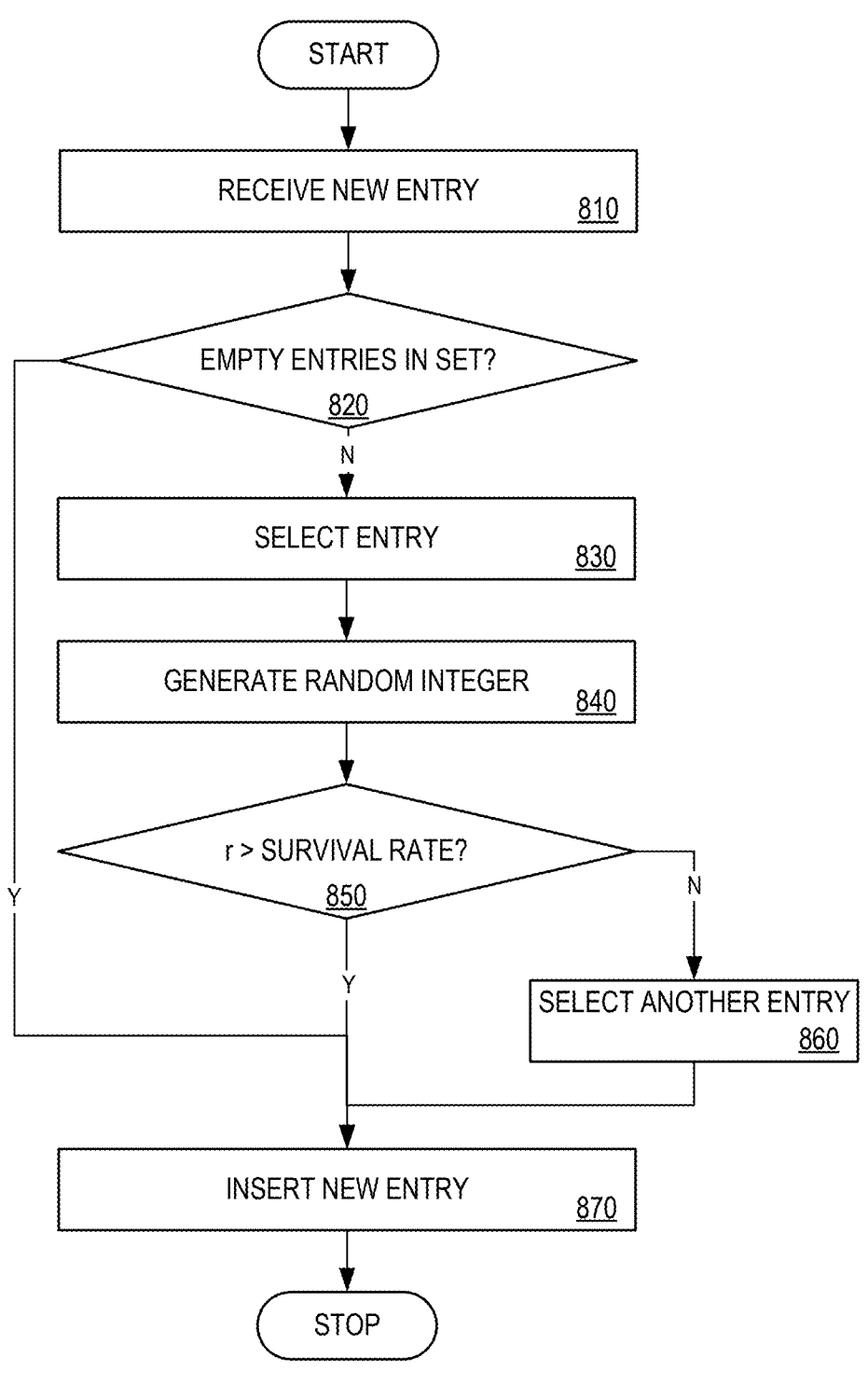
FIG. 8 is a flow diagram illustrating one embodiment of a second chance cache replacement process.

FIG. 8 is a flow diagram illustrating one embodiment of a second chance cache replacement process. At processing block 810, e_new is received. At decision block 820, a determination is made as to whether an empty entry exists in the set. If so, e_new is inserted, processing block 870. Otherwise, a random entry (e1) is selected, processing block 830. At processing block 840, a random variable (e.g., r (0≤r≤1)) is generated. At decision block 850, a determination is made as to whether r is greater than the survival rate of the selected entry e1 (e.g., r>survival rate of e1). At processing block 860, a second entry (e2) is randomly selected upon a determination that r is not greater than the survival rate of e2. At processing block 870, e_new is inserted by replacing either e1 or e2.

The above-described hybrid cache mechanism enhances the performance of cache management by differentiating contents in cache entries with priorities. Thus, the mechanism improves the policy lookup process in an enterprise-grade network system in which a variety of content types of search results are needed. Although described above with reference to a network security system, the hybrid cache management mechanism may be applied to a variety of systems that require cache sharing among multiple data types since the mechanism enhances the performance of cache management by differentiating contents in cache entries with priorities.

Thus, it will be appreciated by those of ordinary skill in the art that the diagrams, schematics, illustrations, and the like represent conceptual views or processes illustrating systems and methods. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing described embodiments. Those of ordinary skill in the art further understand that the exemplary hardware, software, processes, methods, and/or operating systems described herein are for illustrative purposes and, thus, are not intended to be limited to any particular named.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments, other and further embodiments may be devised without departing from the basic scope thereof. The scope of the embodiments is determined by the claims that follow. The embodiments are not limited to the described embodiments, versions or examples, which are included to enable a person having ordinary skill in the art to make and use the embodiments when combined with information and knowledge available to the person having ordinary skill in the art.

What is claimed is:

1. A system comprising:
at least one physical memory device to store a cache table and report generation logic and cache management logic; and
one or more processors coupled with the at least one physical memory device to execute the cache management logic to:
assign a priority value to each content type inserted into each line in the cache table, wherein a cache line includes a tag, a type identifier (ID) and a payload;
generate a type-boundary bitmap (TBBM) including a priority associated with each type ID implemented in the cache table;
map each type ID to a priority value;
perform a replacement operation based on priority values of entry content type, including:
receiving a request to insert a new entry;
randomly selecting a type ID;
locating a first entry in the cache table having the type ID; and
replacing the first entry with the new entry.

2. The system of claim 1, wherein a first cache entry comprises a first type ID indicating a first type of content stored in the first cache entry and a second cache entry comprises a second type ID indicating a second type of content stored in the second cache entry.

3. The system of claim 1, wherein the cache management logic further to assign a survival rate to each type ID implemented in the cache table.

4. The system of claim 3, wherein performing the replacement operation comprises selecting a first random entry in the cache table, generating a random variable, determining whether the random variable is greater than a survival rate associated with the first random entry and replacing the first random entry with a new entry upon determining that the random variable is greater than the survival rate.

5. The system of claim 4, wherein performing the replacement operation further comprises selecting a second random entry in the cache table upon determining that the random variable is not greater than the survival rate.

6. The system of claim 1, wherein the cache management logic further to perform a search operation.

7. The system of claim 6, wherein performing the search operation comprises receiving a search request including the type ID and performing a search using the tag and the type ID is included in the cache table.

8. A method comprising:
assigning a priority value to each of a plurality of content types included in cache line entries in a cache table;
generating a type-boundary bitmap (TBBM) including a priority associated with each type ID implemented in the cache table;
mapping each type ID to a priority value; and
performing a replacement operation based on priority values of entry content type, including;
receiving a request to insert a new entry;
randomly selecting a type ID;
locating a first entry in the cache table having the type ID; and
replacing the first entry with the new entry.

9. The method of claim 8, further comprising assigning a survival rate to each type ID.

10. The method of claim 8, further comprising performing a search operation.

11. The method of claim 10, wherein performing the replacement operation comprises receiving a request to insert a new entry, determining a first entry in the cache table having a lower priority than the new entry and replacing the first entry with the new entry.

12. The method of claim 10, further comprising assigning a threshold value to each type ID implemented in the cache table and assign a counter to each type ID, wherein each counter represents a quantity of entries in the cache table associated with a type ID.

13. The method of claim 12, wherein performing the replacement operation comprises receiving a request to insert a new entry, determining whether a counter has a value that is greater than an associated threshold value and replacing a first entry having a type ID associated with the counter with the new entry upon determining that the counter has a greater value.

14. The method of claim 13, wherein performing the replacement operation further comprises replacing a random second entry with the new entry upon determining that no counter has the greater value.

15. The method of claim 14, wherein performing the replacement operation further comprises incrementing the counter associated with the type ID for the new entry and decrementing the counter associated with the type ID for the replaced entry.

16. The method of claim 3, wherein performing the search operation comprises:
receiving a search request including the type ID; and
performing a search using a tag and the type ID is included in the cache table.

17. The method of claim 8, wherein performing the replacement operation comprises:
selecting a first random entry in the cache table;
generating a random variable;
determining whether the random variable is greater than a survival rate associated with the first random entry; and replacing the first random entry with a new entry upon determining that the random variable is greater than the survival rate.

18. The method of claim 17, wherein performing the replacement operation comprises selecting a second random entry in the cache table upon determining that the random variable is not greater than the survival rate.

19. The method of claim 8, further comprising assigning a survival rate to each type ID implemented in the cache table.

20. At least one non-transitory computer readable medium having instructions stored thereon, which when executed by one or more processors, cause the processors to:

assign a priority value to each of a plurality of content types included in cache line entries in a cache table;

generate a type-boundary bitmap (TBBM) including a priority associated with each type ID implemented in the cache table;

map each type ID to a priority value; and perform a replacement operation based on priority values of entry content type, including;

receiving a request to insert a new entry;

randomly selecting a type ID;

locating a first entry in the cache table having the type ID; and replacing the first entry with the new entry.

*   *   *   *   *